Nov. 23, 1926.
A. BOUSFIELD
1,607,813
WEIGHING MACHINE
Filed Jan. 14, 1926    2 Sheets-Sheet 2
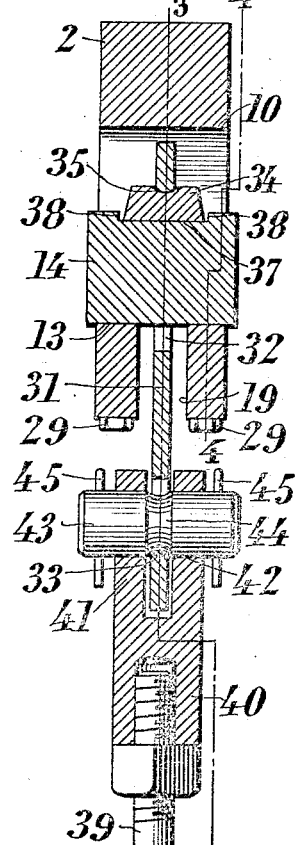
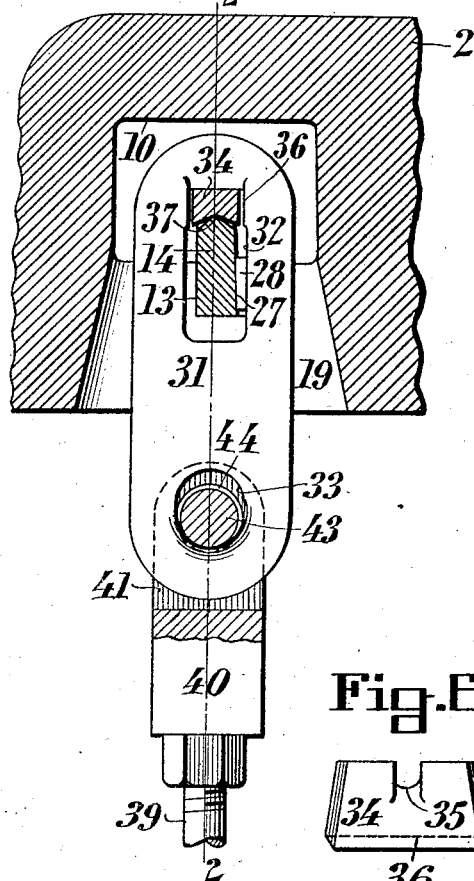
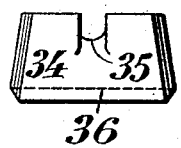
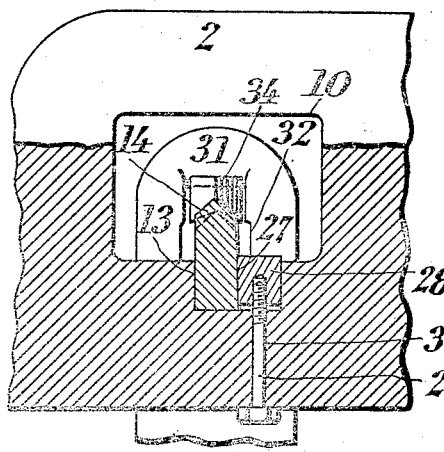
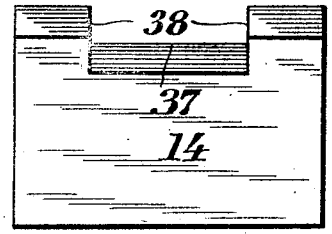
INVENTOR
Alfred Bousfield,
BY
M. J. Gannett
ATTORNEY Patented Nov. 23, 1926.

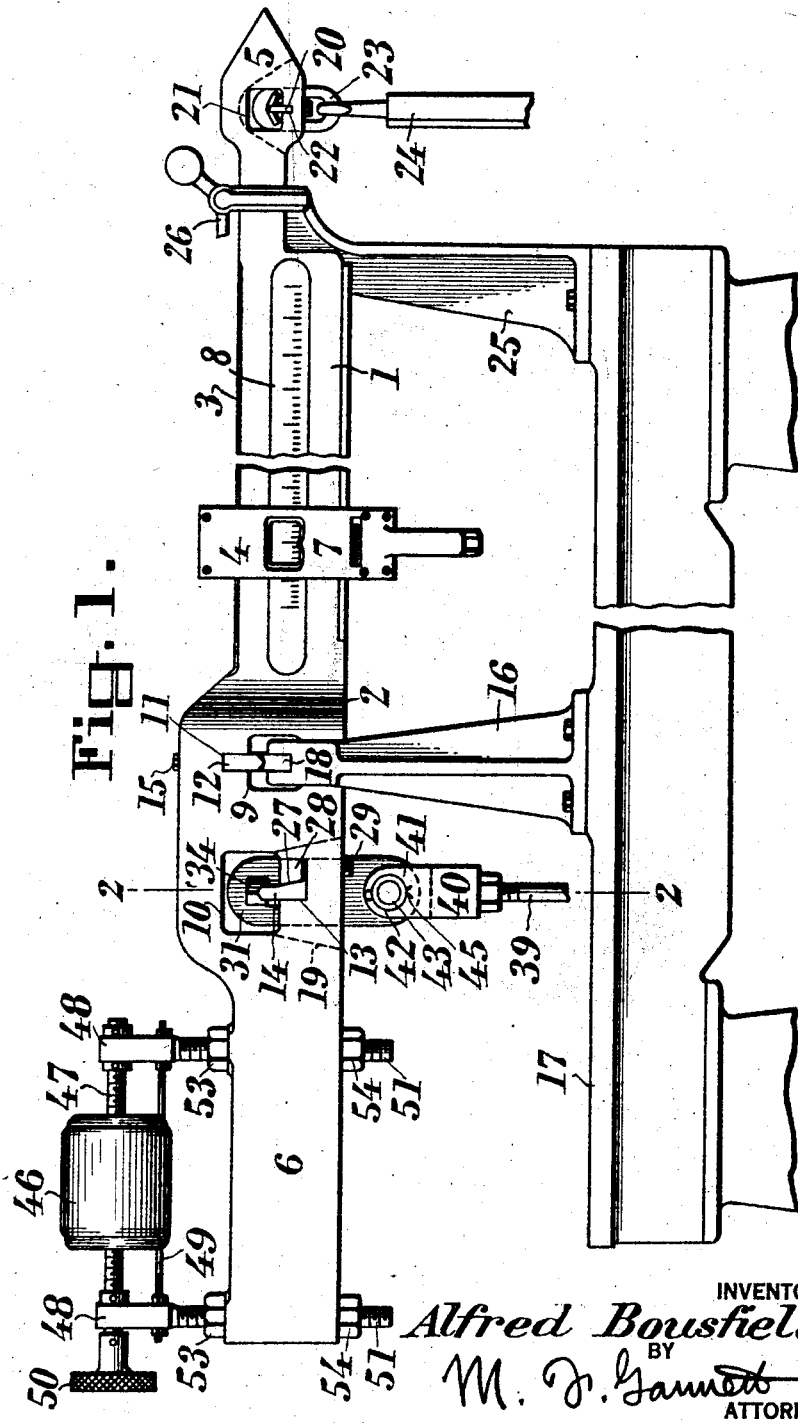

1,607,813

UNITED STATES PATENT OFFICE.

ALFRED BOUSFIELD, OF ST. JOHNSBURY, VERMONT, ASSIGNOR TO E. AND T. FAIRBANKS AND COMPANY, OF ST. JOHNSBURY, VERMONT, A CORPORATION OF VERMONT.

WEIGHING MACHINE.

Application filed January 14, 1926. Serial No. 81,159.

This invention has reference to a weighing scale and aims to provide a device of this character presenting certain improvements over articles of a similar sort as heretofore constructed.

The invention has for a general object improvements in the means employed to connect the load transmitting rod of a weighing scale to the weigh-beam, providing a connection which is relatively simple, reliable and exact in function under varying conditions of service.

Another object is to provide an improved beam whereby the load transmitted thereto is delivered to the longitudinal center line thereof, thereby eliminating torsional stresses in the frame.

A still further object is to provide an improved connecting means between the weigh-beam and load transmitting rod of a weighing machine whereby there is formed a universal joint therebetween.

Other objects will be in part obvious from the following detailed description and in part pointed out hereinafter.

The invention accordingly consists in the features of construction, combination of elements and arrangement of parts which will be exemplified in the construction hereinafter set forth, and the scope of the application of which will be indicated in the following claims.

For a complete understanding of the nature of the invention reference should be had to the accompanying drawings wherein—

Figure 1 is a side elevation of a weigh-beam and associated parts constructed according to my invention;

Fig. 2 is a vertical transverse section taken on the line 2—2 of Fig. 1;

Fig. 3 is a vertical section taken on the line 3—3 of Fig. 2;

Fig. 4 is a similar view taken approximately on the line 4—4 of Fig. 2;

Fig. 5 is a detail view of one of the pivots, and

Fig. 6 is a similar view of one of the bearings.

Referring now to the drawings, the weigh-beam comprises a relatively long, rectangularly shaped bar, 1, having a thickened portion, 2, near one end for reinforcing purposes. A track, 3, carrying a poise, 4, extends forwardly from the portion, 2, and the bar, 1, terminates in a tip, 5. Projecting from the portion, 2, opposite to the track portion, is a rear end or butt, 6. The poise, 4, which can be of any approved design, has a pointer, 7, for indicating weights marked on the scale graduations, 8.

In order that the load stresses from the lever system of the scale (not shown) may be transmitted to the beam, the portion, 2, is provided with a pair of spaced rectangularly shaped openings, 9, and, 10. The opening, 9, has a notch, 11, cut into its upper edge for the reception of a knife edge pivot, 12, while the opening, 10, has a notch, 13, cut into its lower edge for the reception of a knife edge pivot, 14. The pivot, 12, is disposed transversely of the beam and the ends of the pivot project from each side thereof. This pivot is adapted to be detachably secured to the beam by means of a screw, 15.

For the purpose of supporting the beam, use is made of a stand, 16, mounted on a suitable beam-shelf, 17, the top of the stand being provided with concaved bearings, 18, on which the projecting ends of the pivot, 12, seat. In this manner, the beam will be fulcrumed to swing in a vertical path.

A vertical slot, 19, is formed in the beam beneath the lower edge of the opening, 10, the slot being centrally disposed in the beam, in communication with the opening, and enclosed by the sides of the beam. For a purpose to be hereinafter described, the end walls of the slot are inclined away from each other, as shown by Fig. 3. By this construction, the mouth of the slot is considerably wider than the width of the opening, 10. On the other hand, by referring to Fig. 2, it will be seen that the opening, 10, and the slot, 19, together form a T-shaped recess in the beam, which recess is spanned by the pivot, 14.

As is customary in the construction of weigh-beams, the tip, 5, is provided with a knife edge pivot, 20. However, in the present instance, the tip is formed with a rectangular opening, 21, and the pivot, 20, is fixed into a notch, 22, formed in the lower edge of the opening. Suspended from the pivot, 20, is a loop, 23, carrying the upper hooked end of a counter-poise supporting rod 24. A trig stand, 25, is supported on the beam-shelf, 17, and arranged to cooperate with the tip, 5, to indicate balanced position of the beam and to limit vertical swing thereof, or to lock the same in immovable position by means of a pivoted trig, 26.

The pivot, 12, is mounted in the beam with its sharp edge down, while the pivots, 14, and, 20, are arranged with their sharp edges up, the knife edges of all the pivots lying in substantially the same horizontal plane.

In the present design, the pivot, 14, has a length approximately coinciding with the width of the portion, 2, of the beam. However, on account of the great stresses to which this pivot is subjected during use, it is made unusually high in comparison to its length, so that it has a very stocky appearance (see Fig. 5).

In order that the pivot, 14, may be quickly attached or removed from its seat in the notch, 13, one side of the pivot is tapered, or inclined, as indicated by the numeral 27. A block, 28, having a face inclined to correspond with the inclined face of the pivot, is inserted in the notch, being retained in position by a screw, 29, passed upwardly through an opening, 30, in the side of the beam. By this invention, two blocks are used, one on each side of the slot, 19. The blocks function as wedges, and hence will clamp the pivot in position and prevent any rocking thereof, when the screws, 29, are turned up tight.

Suspended from the pivot, 14, is a loop, 31, in the form of a plate having a rectangular opening, 32, near its top, and an annular opening, 33, near its bottom.

A bearing block, 34, having a concaved groove, 35, for engaging with the edge of the loop, is inserted in the opening, 32. The block, which is substantially rectangular in form, is arranged transversely to the loop so as to overlie the pivot, 14. The groove, 35, is cut transversely of the block so as to lie along the longitudinal center line of the beam. The portion of the opening, 32, in which the grooved portion, 35, of the block is mounted is rounded, the radius of curvature being less than the radius of curvature of the concaved groove. In this way, a line contact is provided between the block and the loop, and friction at this point will be reduced to a minimum. Furthermore, the sides of the opening, 32, adjacent to the block, 34, are restricted with respect to the balance of the opening, so as to provide a space having a width only slightly greater than the width of the block, whereby excessive lateral movement of the block with the loop will be prevented when the parts are assembled. The lower edge of the block is also concaved, as indicated at 36, providing a defined seat for the knife edge of the pivot 14.

The block, 34, has a length that is less than the length of the pivot, 14, and in order to prevent the block from sliding along the knife edge of the pivot, the knife edge, instead of being formed along the upper face of the pivot, is recessed in the pivot body, as indicated by the numeral 37 (Figs. 2 and 5). This recessing of the knife edge enables shoulders 38 to be formed along the top of the pivot adjacent each end thereof, such shoulders serving as stops against which the ends of the block can abut, should the parts shift with respect to each other.

The knife edge, 37, of the pivot, 14, can be formed with sides having any desired inclination. As shown, the top of the shoulders, 38, are also inclined. This construction of the shoulders is not necessary, and if so desired the top of the shoulders can be flat. However, in manufacturing the pivots, it is desirable to provide a gauge for the knife edge. Hence, if the top of the shoulders, 38, are formed with inclined surfaces corresponding to the inclination of the sides of the knife edge of the pivot, then a tool can be used which will enable the operator to properly construct the parts. In this manner, perfect machining of the parts can be readily accomplished.

The loop, 31, is connected to the lever system of the scale through a rod, 39. The upper end of the rod is threaded into a yoke, 40, the latter being substantially U-shaped, disposed directly beneath the beam, and having spaced legs, 41. The legs are provided with alined apertures, 42. A trunnion pin, 43, is passed through the apertures, 42, of the yoke and the opening, 33, of the loop. The pin has a concaved groove, 44, formed therein for engaging with the edge of the opening, 33. The lower portion of the opening, 33, is rounded, the radius of curvature being less than the radius of curvature of the concaved groove in the pin. In this way, a line contact is provided between the pin and the loop, and friction at this point will be reduced to a minimum. The line of contact is disposed along the longitudinal center line of the beam. This construction, it will be noticed, also prevents the pin from sliding with respect to the loop. However, cotter pins, 45, are mounted in the extremities of the pin to serve as auxiliary means for retaining the parts together. The cotter pins are spaced from the sides of the yoke, so as to maintain a loose connection therebetween, which is desirable.

During the operation of the device, there is a tendency for a vibratory movement being imparted to the rod, 39. Therefore, the loop should be free to swing on its pivotal connection with the beam. Hence, the desirability of forming the slot, 19, in the manner shown will be readily apparent.

The construction described provides in effect a universal joint between the load transmitting rod and the weigh-beam. At the same time the disposition of the pivotal bearing points is such that the load is transmitted substantially linearly at the intersection of the center planes of the loop and the beam. Furthermore, the above described connection between the load transmitting rod and the weigh-beam permits ready adjustment of the parts, and easy replacement when desired. As the loop projects into the beam and is pivoted thereto along its longitudinal center line, load stresses will be transmitted centrally of the beam without causing rocking thereof.

Means for completing the precise balancing of the beam in zero or no load position are provided by a balance ball 46.

For the purpose of enabling the ball to be moved longitudinally, a rod, 47, threaded through the ball, is rotatably mounted in the upper ends of a pair of standards, 48, spaced from each end of the ball. The ball is restrained from rotation by a rod, 49, connecting the standards and bearing against the lower edge of the ball. The rod, 47, is provided at its outer end with an operating hand wheel, 50.

In order that the ball may be vertically shifted with respect to the end of the beam, the standards, 48, are formed with threaded shanks, 51, which are passed downwardly through openings, formed in the butt, 6, nuts, 53, being mounted on the shanks to bear against the upper edge of the beam, and nuts, 54, being mounted on the lower ends of the shanks to bear against the bottom of the beam.

By this construction the balance ball can be shifted both longitudinally and vertically to adjust the center of gravity of the beam relatively to its supports. The preliminary adjustment is accomplished by raising or lowering the standards, 48, carrying the ball, by turning the nuts, 53, and, 54, either up or down, and the final adjustment being obtained by manipulating the hand wheel, 50, to move the ball longitudinally of its support.

It will furthermore be perceived that the construction of the connecting means between the load transmitting rod and the weigh-beam utilized by my present invention is of such a nature as to constitute a considerable improvement over mechanisms as heretofore provided, in that aside from other advantages achieved, the liability of damage occurring to the parts is reduced to a minimum. Also, it will be noted that by means of a loop provided within the scope of the present invention, such for example that illustrated, the simplicity of the construction is materially enhanced.

Thus among others, the objects aforementioned are accomplished and it will be perceived that the mechanism may be rearranged and modified according to the most desirable practice, and that any suitable bearings and pivots may be used in lieu of those herewith shown.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understod that the language used in the following claims is intended to cover all of the generic and specific features of the invention herein described, and all statements of the scope of the invention which, as a matter of language, might be said to fall therebetween.

Having described my invention, what I claim is:—

1. In a weighing machine, the combination with a weigh-beam and a load transmitting rod, of a plate pivoted to the rod and to the beam, both pivotal connections being rockable at right angles to each other.

2. In a weighing machine, the combination with a weigh-beam and a load transmitting rod, of a plate pivoted to the rod and to the beam, both pivotal connections being rockable in a plurality of directions.

In testimony whereof I hereunto sign my name.

ALFRED BOUSFIELD.